United States Patent [19]

Bueltjer et al.

[11] Patent Number: 4,731,410
[45] Date of Patent: Mar. 15, 1988

[54] POLYURETHANE ADHESIVE MIXTURES

[75] Inventors: Uwe Bueltjer, Ludwigshafen; Rainer Hummerich, Worms; Michael Kerber, Weinheim, all of Fed. Rep. of Germany

[73] Assignee: BASF Aktiengesellschaft, Ludwigshafen, Fed. Rep. of Germany

[21] Appl. No.: 881,244

[22] Filed: Jul. 2, 1986

[30] Foreign Application Priority Data

Jul. 8, 1985 [DE] Fed. Rep. of Germany ....... 3524333

[51] Int. Cl.$^4$ ...................... C08G 18/66; C08G 18/76; C08L 75/06
[52] U.S. Cl. .................................. 524/539; 524/590; 525/440; 528/67; 528/83
[58] Field of Search .................... 528/83, 67; 525/440; 524/539, 590

[56] References Cited

U.S. PATENT DOCUMENTS

| | | | |
|---|---|---|---|
| 3,362,979 | 1/1968 | Bentley | 528/83 |
| 3,538,055 | 11/1970 | Camileri et al. | |
| 3,674,481 | 7/1972 | von Konig et al. | 96/29 |
| 3,806,486 | 4/1974 | Endriss et al. | 260/31.2 N |
| 3,917,742 | 11/1975 | Harlan, Jr. | 260/859 R |
| 3,991,255 | 11/1976 | Blaskiewicz et al. | 428/425 |
| 4,113,014 | 9/1978 | Kubens | 528/67 |
| 4,162,357 | 7/1979 | Kubens | 528/67 |
| 4,163,095 | 7/1979 | Kubens et al. | |
| 4,240,861 | 12/1980 | Meckel et al. | 156/331 |
| 4,546,039 | 10/1985 | Horacek et al. | |
| 4,618,651 | 10/1986 | Gilch et al. | |

FOREIGN PATENT DOCUMENTS

| | | |
|---|---|---|
| 923085 | 4/1963 | United Kingdom . |
| 1081705 | 8/1967 | United Kingdom . |
| 1400756 | 7/1975 | United Kingdom . |

*Primary Examiner*—Patricia A. Short
*Attorney, Agent, or Firm*—Keil & Weinkauf

[57] ABSTRACT

Polyurethane adhesive mixtures or polyurethane adhesive solutions contain (a) a polyurethane elastomer which advantageously has a mean molecular weight of not less than 30,000 and which is prepared by reacting
  (i) one or more essentially linear polyesterpolyols and
  (ii) one or more chain extenders with
  (iii) a mixture of 4,4'- and 2,4'-diphenylmethane diisocyanate isomers in a weight ratio of from 60:40 to 40:60 and
(b) if appropriate, additives and/or organic solvents.

10 Claims, No Drawings

POLYURETHANE ADHESIVE MIXTURES

The use of substantially linear hydroxyl-containing polyester-polyurethanes for adhesively bonding plasticizer-containing polyvinyl chlorides and natural and synthetic rubbers to one another and to other materials is known, and is described in, for example, German Pat. No. 1,256,822 (British Pat. No. 1,081,705).

The disadvantage of these adhesives is inadequate adhesion to, in particular, soft, transparent rubber grades; this adhesion can only be improved by an expensive, additional operation. Examples of methods for the pretreatment of the rubber surface which are described in the literature include painting the surface with oxidizing acids, eg. sulfuric acid (German Pat. No. 807,719), halogenation with chlorine-donating or bromine-donating compounds (German Laid-Open Application DOS No. 2,550,823 and U.S. Pat. No. 3,991,255) or the application of an undercoat consisting of polychloroprene or another halogen-containing polymer (U.S. Pat. No. 3,917,742). In practice, it is difficult to modify the surface of the rubbers chemically by these methods. Moreover, toxic by-products occur, for example in the pretreatment with sulfuric acid and with halogen, necessitating special protective measures and making the processes more expensive.

To overcome these disadvantages, German Published Application DAS No. 2,113,631 (U.S. Pat. No. 3,806,486) proposes incorporating commercial polyester-polyurethane adhesive solutions. By means of this measure, a substantial improvement in adhesion on rubber materials is achieved without a complicated pretreatment.

According to German Pat. No. 1,086,374 (British Pat. No. 923,085), by adding maleic acid or maleic anhydride to two-component adhesives, the adhesion of the adhesive to materials which are difficult to bond can be improved, and an increase in the viscosity of the polyester-polyurethane component can be prevented. However, the disadvantage of these processes is that the added carboxylic acids and carboxylic acid derivatives can result in hydrolytic cleavage of the polyurethanes, particularly at elevated temperatures and relatively high atmospheric humidity, and hence reduce the shelf life of the adhesives and the strength of the adhesive bond.

European Laid-Open Application No. 548 describes the improvement in the adhesion of polyurethanes to various materials by the use of dihydroxypolyurethanes which contain ionic and carboxyl groups. However, the incorporation of ionic groups does not simply result in an improvement in the adhesion of the polyurethane adhesive but also has an adverse effect on other properties, such as the solution viscosity and heat distortion resistance.

In particular, mechanical loading at elevated temperatures leads to partial parting of the adhesive bond in the case of many known adhesives consisting of high molecular weight hydroxypolyurethanes. It is known that the stability of the adhesive bonds at elevated temperatures under load can be increased by adding polyisocyanates, for example triphenylmethane triisocyanate, to these adhesives. The disadvantage of this procedure, however, is that the adhesives have a restricted shelf life when the polyisocyanates are added. Only a short time after the addition of the polyisocyanate, the viscosity of the adhesive solution increases, and the adhesive solution undergoes irreversible gelling in the course of no more than a few days and hence becomes absolutely useless. Moreover, the adhesive has to be mixed on site from two components, directly before use. Unsatisfactory bonds can easily result through inexact metering in the case of fairly small adhesive batches, and through insufficient mixing of the components in the case of larger batches.

DE-A-No. 19 30 336 (U.S. Pat. No. 3,718,518) discloses the use of an alkanediol of not less than 4 carbon atoms as a reaction component in the preparation of the starting polyadduct, in order to increase the strength of adhesive bonds with hydroxypolyurethanes at elevated temperatures. In this way, it is possible to impart strength to hydroxypolyurethane adhesive bonds at elevated temperatures directly after adhesive bonding, without the addition of polyisocyanate, the strength imparted generally being sufficient to withstand the forces originating from the adhesively bonded materials.

On the other hand, the strength proves to be completely inadequate for withstanding additional, in particular prolonged, external mechanical loading of the adhesive bonds at elevated temperatures. For example, soles become detached from the uppers to which they are bonded when used for walking on hot streets in summer, or adhesive bonds in upholstered furniture part when the furniture is used in the vicinity of radiators. These disadvantages cannot be overcome in a simple manner by increasing the amount of alkanediol stated in DE-A No. 19 30 336. This simply gives polyurethanes which are completely or partially insoluble in the physiologically acceptable solvents usually employed in adhesive production.

To reduce the solubility problems, DE-A-No. 21 61 340 (British Pat. No. 1,400,756 describes the addition of a mixture of two or more diols as chain extenders, each in an amount of from 0.1 to 1 mole per mole of polyester-polyol. Mixing and optimizing the composition of such diol mixtures in order to achieve good adhesive properties are complicated and time-consuming. Moreover, only a small number of cheap diols are available. Adding diols which are little used industrially inevitably makes the adhesive raw materials more expensive.

It is an object of the present invention to provide polyurethane adhesive mixtures which give adhesive bonds having improved heat distortion resistance and peeling strength.

We have found, surprisingly, that this object is achieved by using special mixtures of 4,4'- and 2,4'-diphenylmethane diisocyanate isomers for the preparation of the polyurethane elastomers.

The present invention therefore relates to polyurethane adhesive mixtures which contain
(a) a polyurethane elastomer prepared by reacting
   (i) one or more essentially linear polyester-polyols and, if required,
   (ii) one or more chain extenders with
   (iii) a mixture of 4,4'- and 2,4'-diphenylmethane disocyanate isomers in a weight ratio of from 60:40 to 40:60 and
(b) if appropriate, additives and/or organic solvents.

The present invention furthermore relates to polyurethane adhesive solutions which consist of
(a) the polyurethane elastomer (a) described above and
(b) one or more organic solvents.

By using mixtures of 4,4'- and 2,4'-diphenylmethane diisocyanate isomers in a weight ratio of from 60:40 to 40:60, preferably from 55:45 to 45:55, in particular about 50:50, the preparation of the polyurethane elastomers (a) which can be used according to the invention can be carried out employing up to 2 moles of chain extender per mole of polyester-polyol, a measure which makes it possible to improve the peeling strength and in particular the heat distortion resistance of the adhesive bond.

In conjunction with a high content of chain extender, based on the polyester-polyol, the use of 4,4'- and 2,4'-diphenylmethane diisocyanate isomer mixtures containing more than 60% by weight, based on the weight of the isomer mixture, of 4,4'-diphenylmethane diisocyanate leads to polyurethane elastomers which are insufficiently soluble, if at all, in the conventional organic solvents suitable for adhesive solutions, whereas a content of more than 60% by weight of 2,4'-diphenylmethane diisocyanate gives polyurethane elastomers whose hard phase has insufficient crystallinity.

The polyurethane elastomers (a) which can be used according to the invention have substantially improved initial adhesion and heat distortion resistance compared with elastomers based on 2,4- and/or 2,6-toluylene diisocyanate and 4,4'-diphenylmethane diisocyanate.

The polyurethane adhesive mixtures are advantageously prepared using polyurethane elastomers (a) which have a mean molecular weight (number average as obtained by determination of the end groups) of not less 30,000, preferably from about 50,000 to about 1,000,000, determined by the light scattering method. Polyurethane elastomers of this type can be prepared by polyaddition of essentially linear polyester-polyols, with or without chain extenders, and mixtures of 4,4'- and 2,4'-diphenylmethane diisocyanate isomers in the above weight ratios.

For the purposes of the present invention, essentially linear polyester-polyols are those which have a functionality of from 2 to not more than 3, in particular 2, and molecular weights of from 1,200 to 6,000, preferably from 1,800 to 4,000, and are prepared by polycondensation of alkanedicarboxylic acids of 4 to 12, preferably 6 to 10, carbon atoms and alkanediols of 2 to 10, preferably 4 to 6, carbon atoms, or of straight-chain hydroxyalkanemonocarboxylic acids of not less than 5 carbon atoms, eg. ε-hydroxycaproic acid, and by polymerization of lactones, eg. ε-caprolactone. Examples of alkanedicarboxylic acids are succinic, pimelic, suberic, azelaic, sebacic and preferably adipic acid, and examples of alkanediols are ethanediol, propane-1,3-diol, octane-1,8-diol, decane-1,10-diol and preferably butane-1,4-diol, pentane-1,5-diol and hexane-1,6-diol.

Preferably used polyester-polyols are those prepared from ε-hydroxycaproic acid, ε-caprolactone and in particular adipic acid and butane-1,4-diol and/or hexane-1,6-diol.

Although the presence of chain extenders is not absolutely essential for the preparation of the polyurethane elastomers (a), they are preferably used for improving the heat distortion resistance of the adhesive bond. Particularly suitable chain extenders are diols or diol mixtures having molecular weights of from 62 to 300, preferably from 62 to 150. Examples of suitable diols are ester diols, such as bis-(2-hydroxyethyl)terephthalate, ether diols, such as hydroquinone bis-(2-hydroxyethyl)ether, and preferably alkanediols of 2 to 8, in particular 4 to 6, carbon atoms, such as ethanediol, propane-1,3-diol, pentane-1,5-diol and preferably butane-1,4-diol and hexane-1,6-diol. Where chain extenders are present, from 0.01 to 2, preferably 0.5 to 1.8, in particular from 1.3 to 1.6, moles of chain extender or of a mixture of two or more chain extenders, eg. a butane-1,4-diol/hexane-1,6-diol mixture, are employed per mole of polyester-polyol. Butane-1,4-diol has proven particularly useful as a chain extender and is therefore preferably used.

The polyurethane elastomers (a) which may be used according to the invention can be prepared in the melt or in solution in the presence of inert organic solvents by the prepolymer method or, preferably, the economical one-shot method. Examples of suitable inert organic solvents are toluene, acetone, methyl ethyl ketone, ethyl acetate, butyl acetate, methylene chloride, trichloromethane and dimethylformamide, as well as mixtures of these. In this process, the mixture of 4,4'- and 2,4'-diphenylmethane diisocyanate in a weight ratio of from 60:40 to 40:60 and the polyesterpolyols, or preferably a mixture of polyesterpolyols and chain extenders, are reacted for from 0.05 to 4, preferably about 0.1 to 2, hours at from 20° to 200° C., preferably from 60° to 150° C., in amounts such that the ratio of NCO to OH groups is from 0.90:1 to 1.10:1, preferably from 1.0:1 to 1.05:1.

For use as polyurethane adhesives, the mixtures which contain (a) a polyurethane elastomer prepared according to the invention and (b), if appropriate, additives and/or organic solvents can be processed as a melt or in the form of a solution in a suitable solvent, for example a solvent of the abovementioned type. The polyurethane adhesives are preferably used in the form of solutions which consist of from 5 to 40, preferably from 8 to 20, parts by weight of a polyurethane elastomer (a) and from 95 to 60, preferably from 92 to 80, parts by weight of an organic, preferably inert, polar organic solvent or solvent mixture, eg. acetone, ethyl acetate and/or preferably methyl ethyl ketone. The viscosity of the polyurethane adhesive mixture can be adapted to the specific requirements of the adhesive bonding method, or to the materials being bonded, by varying the concentration of the solution. Suitable polyurethane adhesive solutions are obtained simply by dissolving the polyurethane elastomer (a), with or without additives (b), in the organic solvent or solvent mixture at room temperature or moderately elevated temperatures, eg. from 20° to 40° C.

To achieve special properties, for example to prolong the contact bonding time, additives may be incorporated into the polyurethane adhesive mixtures. Examples of suitable additives are natural or synthetic resins, eg. phenol resins, ketone resins, rosin derivatives, phthalate resins, acetylcellulose, nitrocellulose and other substances.

To process the polyurethane adhesive mixtures, which are in the form of a melt or, preferably, in solution, they are applied onto the surfaces of the material which are to be adhesively bonded and which may or may not have been roughened or pretreated in another manner. Application can be effected with the aid of a roller, a brush, a trowel, a spray gun or another apparatus. After the solvents have substantially evaporated, the coatings are activated by heating them for a short time to about 50° to 150° C., preferably 60°–100° C., and adhesive bonding is then effected under a pressure of about 0.2–0.6 N/mm².

The novel polyurethane adhesive mixtures are advantageously applied onto the surface to be bonded in an amount of from 60 to 110 g/m² and can be used for bonding a large number of materials, for example paper, cardboard, wood, groundwood, wood chips, metal, leather, etc., the adhesive bond having high strength. However, the novel products are preferably used for adhesively bonding vulcanized and unvulcanized natural and synthetic rubbers or mixtures of these with reclaimed rubbers. Examples of suitable synthetic rubber are the various copolymers of butadiene with styrene, acrylonitrile and isobutene, as well as poly-cis-isoprene and poly-cis-butadiene.

EXAMPLES 1 TO 9 AND COMPARATIVE EXAMPLES I TO III

General method of preparation 1 mole of butane-1,4-diol adipate having a molecular weight of 2,300 was mixed with the stated number of moles of butane-1,4-diol or hexane-1,6-diol, as a chain extender, and the mixture was heated to 80° C. At this temperature, the aromatic diisocyanate was added, the reaction mixture was stirred for from 5 to 9 minutes, and the hot melt was then poured into a polyethylene beaker and heated at 115° C. for 24 hours. Cooling the mixture to room temperature gave a solid polyurethane elastomer which, in the form of a 15% strength by weight solution in methyl ethyl ketone, had the stated viscosity for the principal heat treatment (PH). The sample was subsequently heated (SH) at 85° C. for a further 48 hours, after which the solution viscosity in methyl ethyl ketone was again determined.

The type and amount of organic diisocyanates used, and the solution viscosity measured for the 15% strength by weight solution in methyl ethyl ketone at 25° C., are summarized in Table 1.

TABLE 1

| Examples | Butane-1,4-diol adipate [moles] | Butane-1,4-diol [moles] | Hexane-1,6-diol [moles] | Diisocyanate [moles] | 4,4'-/2,4'-isomer ratio [parts by weight] | HT [mPa.s] | NT [mPa.s] |
| --- | --- | --- | --- | --- | --- | --- | --- |
| 1 | 1 | — | — | 1.04 | 50:50 | 750 | 1200 |
| 2 | 1 | 0.5 | — | 1.53 | 50:50 | 650 | 950 |
| 3 | 1 | 1 | — | 2.03 | 50:50 | 600 | 1000 |
| 4 | 1 | 1.5 | — | 2.525 | 50:50 | 585 | 775 |
| 5 | 1 | 2.0 | — | 3.00 | 50:50 | 1040 | 1150 |
| 6 | 1 | 1.5 | — | 2.57 | 60:40 | 950 | 1150 |
| 7 | 1 | 1.5 | — | 2.58 | 42:58 | 900 | 1000 |
| 8 | 1 | — | 1.5 | 2.58 | 47:53 | 600 | 600 |
| 9 | 1 | — | 2.0 | 3.05 | 50:50 | 550 | 600 |
| Comparative examples | | | | | | | |
| I | 1 | 1.5 | — | 2.505 | 30:70 | insoluble | |
| II | 1 | 1 | — | 2.02 | 100:0 | insoluble | |
| III | 1 | — | — | 1.02 | 2,4-/2,6-toluylene diisocyanate isomer mixture in a weight ratio of 80:20 | 601 | 769 |

The adhesive properties of the products of Examples 1 to 9 and of Comparative Example III were tested using the 15% strength by weight adhesive solutions in methyl ethyl ketone which are described in Table 1. The following properties were determined, using the European test methods for shoe materials and shoe adhesives:

(1) Peeling strengths, ie. the immediate values and the 5-day values on Nora in N/mm
(2) Heat distortion resistance (HDR) in °C./N.

The measured values are summarized in Table 2.

TABLE 2

| Example | Peeling strength immediate | [N/mm] on Nora 5 days | HDR [°C./N] |
| --- | --- | --- | --- |
| 1 | 0.29 | 4.53 | 50/0 |
| 2 | 0.39 | 4.69 | 50/0 |
| 3 | 0.98 | 4.22 | 50/10 |
| 4 | 1.62 | 5.77 | 60/20 |
| 6 | 1.45 | 3.56 | 50/25 |
| 7 | 0.9 | 1.50 | 50/5 |
| 8 | 1.2 | 1.60 | 50/5 |
| 9 | 1.4 | 1.9 | 50/10 |
| Comparative Example III | 0.16 | 4.29 | 50/0 |

We claim:

1. A polyurethane adhesive mixture comprising a polyurethane elastomer prepared by reacting at least one essentially linear polyester-polyols and at least one chain extender with a mixture of 4,4'- and 2,4'-diphenylmethane diisocyanate isomers in a weight ratio of from 60:40 to 40:60.

2. A polyurethane adhesive as claimed in claim 1 which further contains at least one organic solvent.

3. A polyurethane adhesive mixture as claimed in claim 1 wherein the polyurethane elastomer has a mean molecular weight of not less than 30,000, determined by the light scattering method.

4. A polyurethane adhesive mixture as claimed in claim 1 wherein the linear polyester-polyol has a molecular weight of from 1,200 to 6,000 determined by the light scattering method.

5. A polyurethane adhesive mixture as claimed in claim 1 wherein the linear polyester-polyol is a polyadipate having a molecular weight of from 1,800 to 4,000 determined by the light scattering method and prepared by reacting adipic acid with a member selected from the group consisting of butane-1,4-diol, hexane-1,6-diol and mixtures thereof.

6. A polyurethane adhesive mixture as claimed in claim 1 wherein the chain extender has a molecular weight of from 62 to 300.

7. A polyurethane adhesive mixture as claimed in claim 1 wherein the chain extender is butane-1,4-diol.

8. A polyurethane adhesive mixture as claimed in claim 1 wherein up to 2 moles of at least one chain extender per mole of polyester-polyol is used.

9. A polyurethane adhesive mixture as claimed in claim 1 wherein one mole of a polyester-polyol and up to 2 moles of a chain extender are reacted with the diisocyanate isomers in amounts such that the ratio of NCO to OH groups is from 0.90:1 to 1.10:1.

10. The polyurethane adhesive as claimed in claim 2 comprising from 5 to 40 parts by weight of a polyurethane elastomer and from 95 to 60 parts by weight of an organic solvent.

* * * * *